April 21, 1953  E. H. PUGH  2,635,520
FENDER FOR DISK CULTIVATORS
Filed Jan. 22, 1952  3 Sheets-Sheet 1

Eddie H. Pugh
INVENTOR.

April 21, 1953 E. H. PUGH 2,635,520
FENDER FOR DISK CULTIVATORS
Filed Jan. 22, 1952 3 Sheets-Sheet 2

Eddie H. Pugh
INVENTOR.

April 21, 1953  E. H. PUGH  2,635,520
FENDER FOR DISK CULTIVATORS
Filed Jan. 22, 1952  3 Sheets-Sheet 3
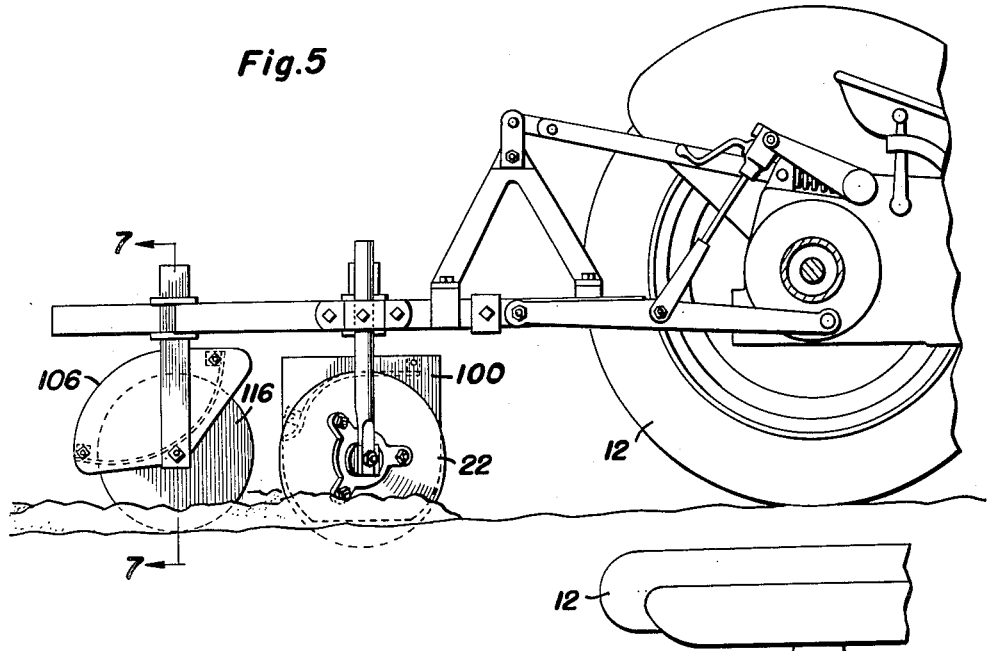
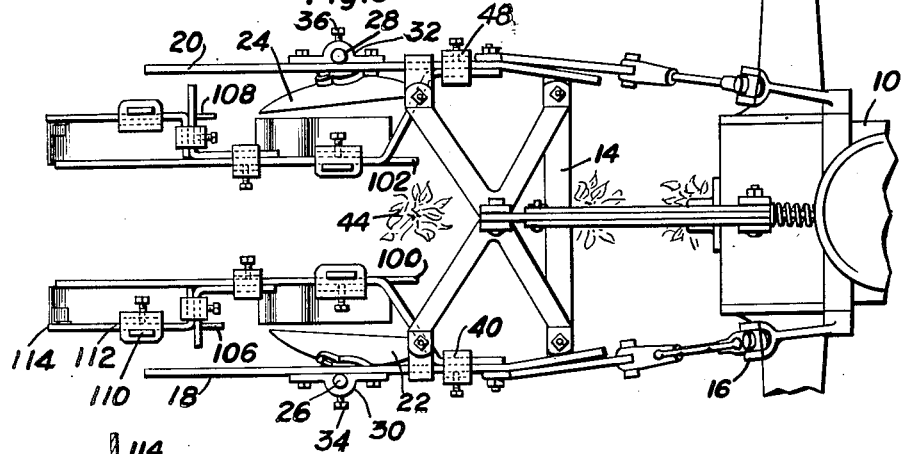
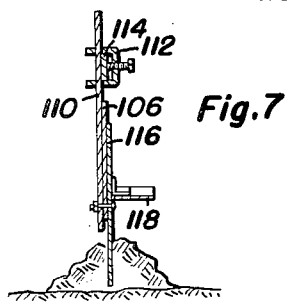
Eddie H. Pugh
INVENTOR.

Patented Apr. 21, 1953

2,635,520

UNITED STATES PATENT OFFICE 2,635,520

FENDER FOR DISK CULTIVATORS

Eddie H. Pugh, Fentress, Va.

Application January 22, 1952, Serial No. 267,551

9 Claims. (Cl. 97—188)

This invention relates to adjustable dirt boards and particularly to dirt boards to be applied to cultivators using rotating disks as the cultivating elements.

In cultivating small plants there is a tendency of the cultivator to throw dirt over around the plants and to cover them up and thus kill the plants. This is particularly noticeable in cultivators using disk-type cultivator elements as the disk type has a tendency to throw the dirt in one direction.

The present invention provides a dirt board arrangement for controlling the flow of dirt from a disk cultivating element to the plants which are being cultivated. The apparatus according to the invention comprises a dirt board interposed between the disk elements and the plants and having an upwardly extending guard to prevent dirt being thrown upwardly along the board. Likewise a second board is rearwardly positioned with respect to the front board and is entirely adjusted therefrom so that a certain amount of projected dirt may pass through between the boards into the vicinity of the plants and cover up small weeds or other objects close to the plants and provide a loose mulch to preserve moisture adjacent the plants.

It is accordingly an object of the invention to provide an improved dirt board.

It is a further object of this invention to provide an adjustable dirt board for controlling the amount of dirt thrown to young plants.

It is a further object of this invention to provide a dirt board having a rotating element so that it will not be caught and snagged by the rocks in the field.

Other objects and many of the attendant advantages of this invention will be apparent from the following detailed description taken in conjunction with the accompanying drawings in which:

Figure 5 is a side elevation showing a modification of the dirt board;

Figure 6 is a top plan view of a modified dirt board; and

Figure 7 is a vertical section through the modified dirt board taken substantially on the plane indicated by line 7—7 of Figure 5.

Figure 1:
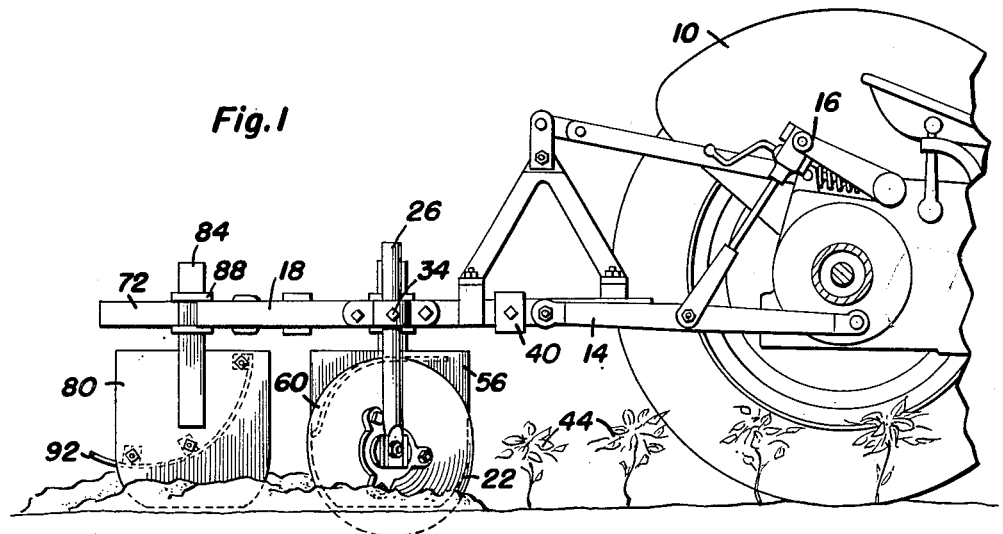
Figure 1 is a side elevation of the dirt board in position on a tractor drawn cultivator.
Figure 2:
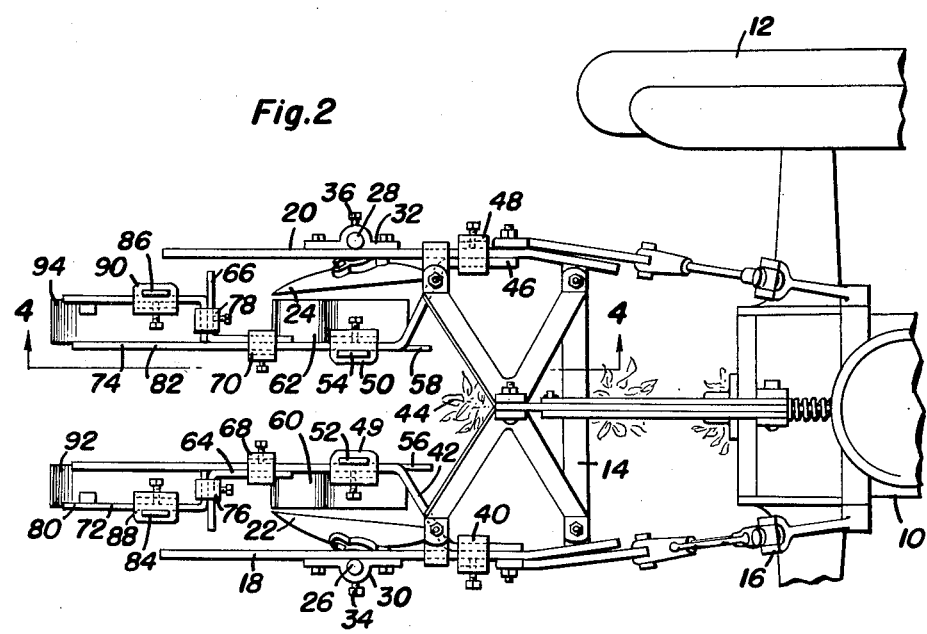
Figure 2 is a top plan view of the cultivator and dirt board.
Figure 3:
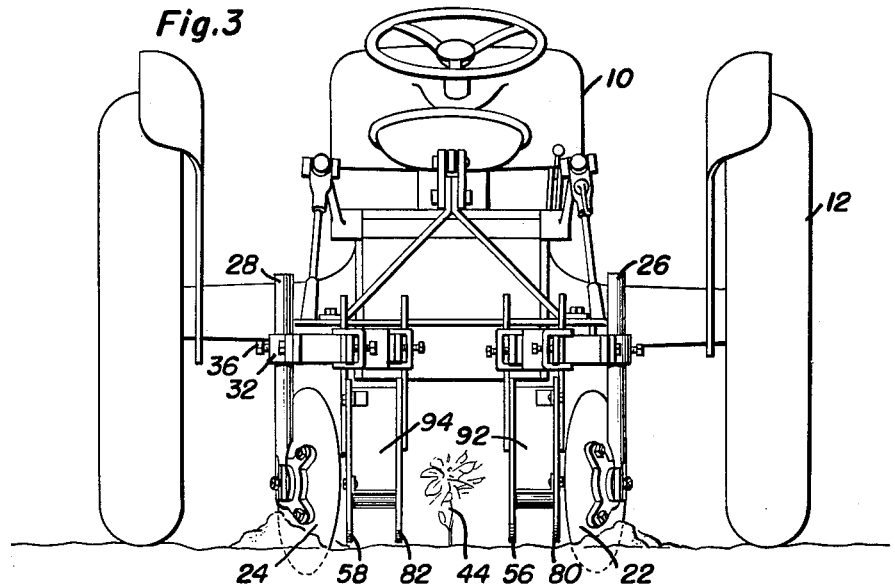
Figure 3 is a rear view of the cultivator showing the dirt boards in place.
Figure 4:
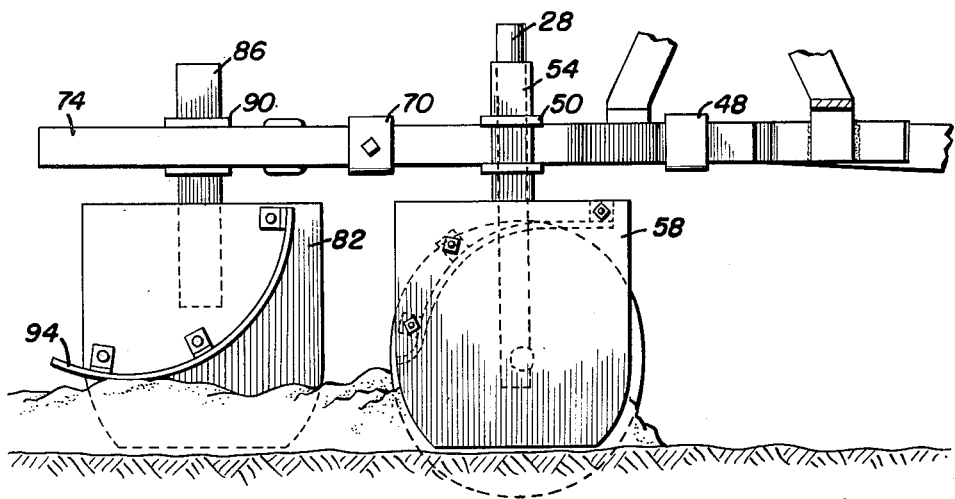
Figure 4 is a vertical section taken substantially on the plane indicated by the line 4—4 of Figure 2 and showing the relation of the dirt board from the direction of the plants being cultivated.

In the exemplification of the invention a tractor indicated generally at 10 is provided with dirt engaging or propeller wheels 12 and is provided with a rearwardly extending hitch 14 which is controlled by means of a conventional hydraulic lift 16.

Extending rearwardly from the hitch 14 a plurality of bars 18 and 20 to which are connected the innermost disks 22 and 24 of a conventional cultivator using disk elements as the cultivating elements. Obviously a plurality of outwardly swung disk elements may be attached to the bars 20 and 22 by suitable branch bars to cultivate the soil between the rows. However, for the purpose of this illustration only the innermost disks, that is the disk closest to the plants, are illustrated for the purpose of this invention.

As is well understood in the art disks 22 and 24 are mounted on standards 26 and 28 which are held in brackets 30 and 32 so that the standards 26 and 28 may be rotatably adjusted to position the throw of the disks 22 and 24 and they may be held in adjusted position by means of the set screws 34 and 36. This is provided with customary and well known disk type cultivators.

Attached to the cultivator bar 18 by means of a suitable clip 40 is a dirt board supporting bar 42 which extends laterally from the disk bar 18 into the vicinity of the row of plants 44. Likewise on the cultivator bar 20 a dirt board supporting beam 46 is held by means of a suitable clamp 48. Longitudinally adjustable on the bars 42 and 46 respectively are the U-clamps 49 and 50 which maintain the upstanding bars 52 and 54 of the dirt boards 56 and 58. Dirt boards 56 and 58 are substantially rectangular in section with the lower edge rounded off so that the dirt boards may more easily clear the plants or obstructions in the field. Preferably the dirt boards 56 and 58 are of substantially the same relative width as the disk elements 22 and 24 but are spaced inwardly toward the row of plants 44 so that there is a material space between the dirt board and the disks 22 and 24. The dirt board 56 carries an upwardly curved guard 60 and the dirt board 58 carries an upwardly curved guard 62. The topmost portions of the guards 60 and 62 are substantially on a level of the top of the cultivator disks 22 and 24 and extend downwardly along the backward edge thereof so that at least the top rear quarter of the disk is practically covered by means of the guards 60 and 62 which substantially extend across the space between the disks 22 and 24 and the dirt boards 56 and 58. The dirt boards 56 and 58 together with the guards 60 and 62 substantially intercept any dirt thrown directly toward the plants by the disks 22 and 24. The dirt boards being vertically adjustable by means of the standards 52 and 54 so that a controlled amount of dirt may flow under the bottom of the dirt boards into the vicinity of the plants.

L-shaped brackets 64 and 66 are held to the bars 42 and 46 respectively by means of clamps 68 and 70. The L-shaped brackets 64 and 66 extend laterally from the bars 42 and 46 and extend across behind the dirt boards 56 and 58 and substantially across the disks 22 and 24. Extension bars 72 and 74 are clamped on the L-shaped brackets 64 and 66 by means of clamps 76 and 78. The extension bars 72 and 74 being laterally adjustable away from the bars 42 and 46 by means of the clamps 76 and 78.

Dirt boards 80 and 82 are mounted on the extension bars 72 and 74 by means of bars 84 and 86 which are secured by clamps 88 and 90. The dirt boards 80 and 82 are therefore adjustable vertically by means of the clamps 88 and 90 and laterally by means of the clamps 76 and 78 and also longitudinally by means of the clamps 88 and 90. The dirt boards 80 and 82 can thus be adjusted with respect to the dirt boards 56 and 58 to control the space therebetween so that the quantity of dirt falling between the dirt boards to the plants 44 can be readily controlled.

Additionally the dirt boards 80 and 82 are provided with laterally extending downwardly curved guards or fenders 92 and 94. The guards 92 and 94 extend inwardly towards the plants and away from the disks 22 and 24, preferably extending adjacent to and tangentially to the ground for controlling not only the flow or dirt but for substantially smoothing a portion thereof adjacent to the plants.

In this operation the dirt boards will be adjusted according to the size of the plants to control the flow of dirt not only under the dirt board directly to the plants but also between the dirt boards so that the actual coverage of the soil adjacent to the plants can be readily controlled. The height and spacing of the dirt boards with respect to each other under the plants being readily adjustable so that any desired proportion of dirt may be thrown to or adjacent to the plants.

In order to prevent fouling of the dirt boards by trash, rocks or other material in the field it is desirable to provide means so that the dirt boards are self-clearing. Such an arrangement is shown in Figures 5, 6 and 7 in which the dirt boards 100 and 102 are provided with disk like bottom portions which are rotatably mounted on the boards 100 and 102. The rear dirt boards 106 and 108 are likewise provided with rotating disk like dirt engaging bottom or work engaging portions which are better shown in Figure 7. The dirt board 106 is mounted on the stem 110, which is held by clamp 112 on extension bar 114, the earth engaging portion of the dirt board comprises a flat disk 116 journaled on the bolt 118 which extends through the board 106 and the stem 110 to provide the necessary axial bearing therefor.

This modification provides a particularly advantageous dirt board for operation on trashy or stony fields so that the earth engaging portions may rotate the clearance of any trash or other material in which it comes in contact.

It will thus be seen that the present invention provides an improved dirt board arrangement for controlling the flow of dirt to or around growing plants so that they will not be covered or destroyed by the cultivating apparatus.

While for purposes of illustration, a particular embodiment has been shown, and described according to the best present understanding thereof, will be apparent to those skilled in the art that many changes and modifications can be made therein without departing from the free spirit of the invention.

Having described the invention, what is claimed as new is:

1. A dirt board for a cultivator comprising a cultivator disk, a vertically extending board interposed in the path of dirt thrown by said disk, said board being laterally spaced from said disk, an arcuate guard on said board, said guard conforming in curvature substantially to and extending substantially parallel to the top rear quarter of said disk.

2. A dirt board assembly for a disk cultivator comprising a board vertically positioned laterally of said disk, said board being interposed in the path of dirt thrown by said disk, said board being spaced from said disk, an upwardly bowed guard mounted on said board, said guard substantially bridging the space between said board and said disk, said guard extending substantially over the top portion of the disk.

3. A dirt board assembly for a disk cultivator comprising a board vertically positioned laterally of said disk, said board being interposed in the path of dirt thrown by said disk, said board being spaced from said disk, an upwardly bowed guard mounted on said board, said guard substantially bridging the space between said board and said disk, said guard extending substantially over the top portion of the disk, the lower portion of said dirt board including a rotatably mounted flat disk.

4. A dirt board assembly for a disk cultivator comprising a board vertically positioned laterally of said disk, said board being interposed in the path of dirt thrown by said disk, said board being spaced from said disk, an upwardly bowed guard mounted on said board, said guard substantially bridging the space between said board and said disk, said guard extending substantially over the top portion of the disk, a second dirt board mounted rearwardly of said first mentioned dirt board, a downwardly curved fender terminating substantially tangentially with the ground.

5. In a cultivator having a cultivating disk, a dirt board assembly comprising a dirt board mounted in spaced substantially parallel relation to the cultivator disk, said board being in the path of dirt thrown by said disk, an upwardly curved guard mounted on said board adjacent the top of the disk, said guard extending between the board and the disk.

6. In a cultivator having a cultivating disk, a dirt board assembly comprising a dirt board mounted in spaced substantially parallel relation to the cultivator disk, said board being in the path of dirt thrown by said disk, an upwardly curved guard mounted on said board adjacent the top of the disk, said guard extending between the board and the disk, said dirt board including a rotatably mounted soil engaging disk.

7. In a cultivator having a cultivating disk, a dirt board assembly comprising a dirt board mounted in spaced substantially parallel relation to the cultivator disk, said board being in the path of dirt thrown by said disk, an upwardly curved guard mounted on said board adjacent the top of the disk, said guard extending between the board and the disk, a second dirt board mounted rearwardly of said first mentioned dirt board and said disk, said second dirt board being offset laterally from said first mentioned dirt board, a downwardly curved guard on said second dirt board, said guard being on the side of the dirt board away from said disk.

8. In a cultivator having a cultivating disk, a dirt board assembly comprising a dirt board mounted in spaced substantially parallel relation to the cultivator disk, said board being in the path of dirt thrown by said disk, an upwardly curved guard mounted on said board adjacent the top of the disk, said guard extending between the board and the disk, a second dirt board mounted rearwardly of said first mentioned dirt board and said disk, said second dirt board being offset laterally from said first mentioned dirt board, a downwardly curved guard on said second dirt board, said guard being on the side of the dirt board away from said disk, said second board being laterally adjustable.

9. In a cultivator having a cultivating disk, a dirt board assembly comprising a dirt board mounted in spaced substantially parallel relation to the cultivator disk, said board being in the path of dirt thrown by said disk, an upwardly curved guard mounted on said board adjacent the top of the disk, said guard extending between the board and the disk, a second dirt board mounted rearwardly of said first mentioned dirt board and said disk, said second dirt board being offset laterally from said first mentioned dirt board, a downwardly curved guard on said second dirt board, said guard being on the side of the dirt board away from said disk, said second board being laterally adjustable, the said engaging portions of said dirt boards including rotatably mounted disks.

EDDIE H. PUGH.

References Cited in the file of this patent

UNITED STATES PATENTS

| Number | Name | Date |
| --- | --- | --- |
| 787,977 | Edwards | Apr. 25, 1905 |
| 1,003,029 | Brigden | Sept. 12, 1911 |
| 1,298,209 | Heylman | Mar. 25, 1919 |
| 1,354,364 | Williams | Sept. 28, 1920 |